US012717744B2

(12) United States Patent
Enamandram et al.

(10) Patent No.: US 12,717,744 B2
(45) Date of Patent: Aug. 25, 2026

(54) SCALABLE ADDRESS DECODING SCHEME FOR CXL TYPE-2 DEVICES WITH PROGRAMMABLE INTERLEAVE GRANULARITY

(71) Applicant: Intel Corporation, Santa Clara, CA (US)

(72) Inventors: Anand K. Enamandram, Folsom, CA (US); Ritu Gupta, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 91 days.

(21) Appl. No.: 17/478,828

(22) Filed: Sep. 17, 2021

(65) Prior Publication Data

US 2023/0086222 A1 Mar. 23, 2023

(51) Int. Cl.

*G06F 13/38* (2006.01)
*G06F 9/46* (2006.01)
*G06F 13/16* (2006.01)
*G06F 13/40* (2006.01)
*G06F 13/42* (2006.01)

(52) U.S. Cl.

CPC ............ *G06F 13/385* (2013.01); *G06F 9/467* (2013.01); *G06F 13/1647* (2013.01); *G06F 13/409* (2013.01); *G06F 13/4221* (2013.01)

(58) Field of Classification Search

CPC ...................................................... Y02D 10/00
See application file for complete search history.

(56) References Cited

U.S. PATENT DOCUMENTS 5,848,006 A * 12/1998 Nagata ..................... G11C 8/12 365/189.08
7,191,341 B2 3/2007 Paaske et al.
7,287,140 B1 10/2007 Asanovic et al.
(Continued)

FOREIGN PATENT DOCUMENTS

CN 108073423 5/2018
CN 113924557 1/2022
(Continued)

OTHER PUBLICATIONS

C. Priebe, K. Vaswani and M. Costa, "EnclaveDB: A Secure Database Using SGX," 2018 IEEE Symposium on Security and Privacy (SP), San Francisco, CA, USA, 2018, pp. 264-278.
(Continued)

*Primary Examiner* — Steven G Snyder
*Assistant Examiner* — Juanito C Borromeo
(74) *Attorney, Agent, or Firm* — Nicholson DeVos Webster & Elliott LLP

(57) ABSTRACT

Methods and apparatus relating to a scalable address decoding scheme for Compute Express Link™ or CXL™ Type-2 devices with programmable interleave granularity are described. In an embodiment, configurator logic circuitry determines an interleave granularity and an address range size for a plurality of devices coupled to a socket of a processor. A single System Address Decoder (SAD) rule for two or more of the plurality of the devices coupled to the socket of the processor is stored in memory. A memory access transaction directed at a first device from the plurality of devices is routed to the first device in accordance with the SAD rule. Other embodiments are also disclosed and claimed.

20 Claims, 9 Drawing Sheets

(56) References Cited

U.S. PATENT DOCUMENTS 8,494,155 B1 7/2013 Poo et al.
8,516,269 B1 8/2013 Hamlet et al.
8,694,778 B2 4/2014 Teuwen et al.
8,819,685 B2 8/2014 Zhang et al.
8,850,225 B2 9/2014 Noehring et al.
8,954,788 B2 2/2015 Abraham et al.
9,064,135 B1 6/2015 Poo et al.
9,100,427 B2 8/2015 Dubrovsky et al.
9,251,380 B1 2/2016 Au et al.
9,584,329 B1 2/2017 Trimberger
9,798,900 B2 10/2017 Oh et al.
9,892,265 B1 2/2018 Tripathy et al.
10,078,754 B1 9/2018 Brandwine et al.
10,193,701 B2 1/2019 Kim et al.
10,521,618 B1 12/2019 Zhang et al.
10,742,421 B1 8/2020 Wentz et al.
10,896,267 B2 1/2021 Ndu et al.
10,999,263 B2 5/2021 Mundra et al.
11,126,733 B2 9/2021 Pappachan et al.
11,205,003 B2 12/2021 Patel et al.
11,321,459 B2 5/2022 Shen et al.
11,720,672 B2 8/2023 Shen
11,847,067 B2 12/2023 Chhabra et al.
11,874,776 B2 1/2024 Chhabra et al.
2002/0097724 A1 7/2002 Halme et al.
2002/0129246 A1 9/2002 Blumenau et al.
2002/0133762 A1 9/2002 Susnow et al.
2004/0123121 A1 6/2004 Paaske et al.
2004/0158711 A1 8/2004 Zimmer
2005/0021986 A1 1/2005 Graunke et al.
2005/0108532 A1 5/2005 Bajikar
2005/0232415 A1 10/2005 Little et al.
2006/0181942 A1 8/2006 Cordero et al.
2006/0193470 A1 8/2006 Williams et al.
2007/0180239 A1 8/2007 Fujibayashi et al.
2008/0002590 A1 1/2008 Thomas et al.
2008/0005706 A1 1/2008 Sharma et al.
2008/0063197 A1 3/2008 Jaquette et al.
2008/0065882 A1 3/2008 Goodman et al.
2008/0162873 A1* 7/2008 Zimmer ................ G06F 9/4405 712/22
2008/0222383 A1 9/2008 Spracklen et al.
2010/0005375 A1 1/2010 Dell et al.
2010/0023739 A1 1/2010 Levit-Gurevich et al.
2010/0054466 A1 3/2010 Kerins et al.
2011/0002461 A1 1/2011 Erhart et al.
2011/0060915 A1 3/2011 Tal
2011/0066837 A1 3/2011 Lee et al.
2011/0149737 A1 6/2011 Muthiah et al.
2011/0320921 A1 12/2011 Gower et al.
2012/0008768 A1 1/2012 Mundra et al.
2012/0030669 A1 2/2012 Tsirkin
2012/0054455 A1 3/2012 Wang et al.
2012/0072737 A1 3/2012 Schrijen et al.
2012/0084674 A1 4/2012 Visosky
2012/0137137 A1 5/2012 Brickell et al.
2012/0144205 A1 6/2012 Shu et al.
2012/0151224 A1 6/2012 Koifman et al.
2012/0151247 A1 6/2012 Ferraiolo et al.
2012/0254862 A1 10/2012 Dong
2013/0013934 A1 1/2013 King et al.
2013/0152099 A1 6/2013 Bass et al.
2014/0022976 A1 1/2014 Chao et al.
2014/0059681 A1 2/2014 Dubrovsky et al.
2014/0079220 A1 3/2014 Wei et al.
2014/0089658 A1 3/2014 Raghuram et al.
2014/0093074 A1 4/2014 Gotze et al.
2014/0122902 A1 5/2014 Isozaki et al.
2014/0133845 A1 5/2014 Dahlfort et al.
2014/0136680 A1 5/2014 Joshi et al.
2014/0258716 A1 9/2014 MacMillan et al.
2014/0270177 A1 9/2014 Brickell et al.
2014/0281456 A1 9/2014 Mejia et al.
2014/0359182 A1 12/2014 Georgiev
2015/0046702 A1 2/2015 Paaske et al.
2015/0188718 A1 7/2015 Falk
2015/0288526 A1 10/2015 Mclean et al.
2015/0350231 A1 12/2015 Dubrovsky et al.
2016/0019396 A1 1/2016 Davis et al.
2016/0139982 A1 5/2016 Yu et al.
2016/0246967 A1 8/2016 Gross et al.
2016/0323096 A1 11/2016 Kara-Ivanov et al.
2016/0364582 A1 12/2016 Cammarota et al.
2017/0022494 A1 1/2017 Hill et al.
2017/0026171 A1 1/2017 Lal et al.
2017/0090815 A1 3/2017 Kelner et al.
2017/0091489 A1 3/2017 Dragone et al.
2017/0093567 A1 3/2017 Gopal et al.
2017/0134409 A1 5/2017 Dubrovsky et al.
2017/0149572 A1 5/2017 Wallrabenstein
2017/0220494 A1 8/2017 Shacham et al.
2018/0088978 A1 3/2018 Li et al.
2018/0095750 A1 4/2018 Drysdale et al.
2018/0107608 A1 4/2018 Kaplan et al.
2018/0189104 A1 7/2018 Agarwal et al.
2018/0204007 A1 7/2018 Rangayyan
2018/0367516 A1 12/2018 Mundra et al.
2019/0004810 A1 1/2019 Jayasimha et al.
2019/0004973 A1 1/2019 Chhabra et al.
2019/0042474 A1 2/2019 Edirisooriya et al.
2019/0075183 A1 3/2019 Silberkasten et al.
2019/0097818 A1 3/2019 Lu et al.
2019/0102293 A1 4/2019 Li et al.
2019/0102568 A1 4/2019 Hausauer et al.
2019/0102577 A1 4/2019 Gueron et al.
2019/0116052 A1 4/2019 Kim et al.
2019/0130103 A1 5/2019 Shen et al.
2019/0149478 A1 5/2019 Mchugh et al.
2019/0165956 A1 5/2019 Adham et al.
2019/0165957 A1 5/2019 Abbott et al.
2019/0227827 A1 7/2019 Zmudzinski et al.
2019/0281025 A1 9/2019 Harriman et al.
2019/0311123 A1 10/2019 Lal et al.
2019/0324725 A1 10/2019 Wang
2019/0342093 A1 11/2019 Chhabra et al.
2019/0347125 A1 11/2019 Sankaran et al.
2019/0361807 A1 11/2019 Desai et al.
2020/0004703 A1 1/2020 Sankaran et al.
2020/0013451 A1 1/2020 Son
2020/0034549 A1 1/2020 Lu
2020/0052892 A1 2/2020 Chhabra et al.
2020/0099658 A1 3/2020 Couillard et al.
2020/0110888 A1 4/2020 Kim et al.
2020/0134208 A1 4/2020 Pappachan et al.
2020/0143067 A1 5/2020 Alemzadeh et al.
2020/0159969 A1 5/2020 Shanbhogue et al.
2020/0175646 A1 6/2020 Boyd et al.
2020/0192842 A1 6/2020 Ng et al.
2020/0226263 A1 7/2020 Patel et al.
2020/0266995 A1 8/2020 Gopal
2020/0272562 A1* 8/2020 La Fratta .............. H04W 4/029
2020/0285492 A1 9/2020 Mihajlovski et al.
2020/0319913 A1 10/2020 Kumar et al.
2020/0342117 A1 10/2020 Richards et al.
2021/0004338 A1 1/2021 Marolia et al.
2021/0149728 A1 5/2021 Wood et al.
2021/0157935 A1 5/2021 Sood et al.
2021/0224202 A1 7/2021 Chhabra et al.
2021/0232694 A1 7/2021 Jannyavula Venkata et al.
2021/0319138 A1 10/2021 Dewan et al.
2021/0342182 A1 11/2021 Kumar et al.
2021/0382836 A1 12/2021 Lantz et al.
2022/0035749 A1 2/2022 Chhabra et al.
2022/0100687 A1 3/2022 Sahin et al.
2022/0182232 A1 6/2022 Marson et al.
2022/0197825 A1 6/2022 Dewan et al.
2022/0198027 A1 6/2022 Chhabra et al.
2022/0209966 A1 6/2022 Chhabra et al.
2022/0209967 A1 6/2022 Chhabra et al.
2022/0209968 A1 6/2022 Chhabra et al.
2022/0209969 A1 6/2022 Chhabra et al.
2022/0318144 A1 10/2022 Bajic et al.
2022/0350503 A1 11/2022 Tkacik et al.
2022/0416997 A1 12/2022 Dewan et al.

(56) References Cited

U.S. PATENT DOCUMENTS

| | | | |
|---|---|---|---|
| 2022/0417042 | A1 | 12/2022 | Chhabra et al. |
| 2023/0032236 | A1 | 2/2023 | Sankaran et al. |
| 2023/0032586 | A1 | 2/2023 | Ranganathan et al. |
| 2023/0102178 | A1 | 3/2023 | Chhabra et al. |
| 2024/0004990 | A1 | 1/2024 | Kakaiya |
| 2024/0054011 | A1 | 2/2024 | Sankaran et al. |

FOREIGN PATENT DOCUMENTS

| | | | |
|---|---|---|---|
| CN | 114647858 | A | 6/2022 |
| CN | 115525335 | A | 12/2022 |
| CN | 115686740 | A | 2/2023 |
| CN | 117083612 | A | 11/2023 |
| CN | 118696296 | A | 9/2024 |
| DE | 102022112551 | A1 | 12/2022 |
| EP | 3547130 | A1 | 10/2019 |
| EP | 3726392 | A1 | 10/2020 |
| EP | 3757849 | A1 | 12/2020 |
| EP | 3757853 | A1 | 12/2020 |
| EP | 4016358 | A1 | 6/2022 |
| EP | 4124965 | A1 | 2/2023 |
| EP | 4152167 | A1 | 3/2023 |
| EP | 4242893 | A2 | 9/2023 |
| EP | 4322006 | A1 | 2/2024 |
| GB | 2578135 | A | 4/2020 |
| JP | 2021064378 | A | 4/2021 |
| NL | 2029658 | A | 7/2022 |
| WO | 2011160957 | A1 | 12/2011 |
| WO | 2019066918 | A1 | 4/2019 |
| WO | 2021035517 | A1 | 3/2021 |
| WO | 2021080732 | A1 | 4/2021 |
| WO | 2021162792 | A1 | 8/2021 |
| WO | 2022132184 | A1 | 6/2022 |
| WO | PCTUS2238546 | | 7/2022 |
| WO | 2023009641 | A1 | 2/2023 |
| WO | 2023113918 | A1 | 6/2023 |
| WO | 2023173276 | A1 | 9/2023 |

OTHER PUBLICATIONS

IBM Cloud Education, "What is Multi-Tenant?" IBM Cloud Learn Hub, retrieved on Dec. 2, 2021 from https://www.ibm.com/cloud/learn/multi-tenant.
International Search Report for International application No. PCT/US2022/038546 (AD8019-PCT), mailed Nov. 18, 2022, 4 pages.
Ionos, Hyperscale Computing—load balancing for large quantities of data, Aug. 24, 2020, downloaded Sep. 2, 2021, 8 pages.
Jack Keil Wolf, an introduction to error correcting codes, Part 1, ECE 154C, Spring 2008, 146 pages.
Wikipedia, "Disk encryption theory," downloaded from "https://en.wikipedia.org/wiki/Disk_encryption_theory#XTS" on Jul. 25, 2023, 7 pages.
Advanced Micro Devices, "Tiered Memory Page Migration Operations Guide," publication # 58151, Revision 0.51, May 2023, 33 pages.
Final Office Action issued in U.S. Appl. No. 17/358,284 on Feb. 22, 2024, 22 pages.
Intel Data Streaming Accelerator Architecture Specification, Revision 2.0, Sep. 2022, 253 pages.
Intel Scalable I/O Virtualization, Technical Specification, Rev. 1.1, Sep. 2020, 29 pages.
Intel TDX Connect Architecture Specification, Mar. 2023, 40 pages.
Notice of Allowance for U.S. Appl. No. 17/482,370, issued Jul. 30, 2024, 8 pages.
Zhao et al., "Contiguitas: The Pursuit of Physical Memory Contiguity in Datacenters," Jun. 2023, 15 pages.
U.S. Appl. No. 17/357,973, filed Jun. 24, 2021, Prashant Dewan, Entire Document.
U.S. Appl. No. 17/358,238, filed Jun. 25, 2021, Siddhartha Chhabra, Entire Document.
GDSII, retrieved from https://en.wikipedia.org/w/index.php?title=GDSII&oldid=1003588402 on Jun. 15, 2021.
J. Zhu et al., "Enabling Rack-scale Confidential Computing using Heterogeneous Trusted Execution Environment," 2020 IEEE Symposium on Security and Privacy (SP), 2020, pp. 1450-1465.
V. Krishnan, O. Serres and M. Blocksome, "COnfigurable Network Protocol Accelerator (COPA): An Integrated Networking/Accelerator Hardware/Software Framework," 2020 IEEE Symposium on High-Performance Interconnects (HOTI), 2020, pp. 17-24.
International Preliminary Report on Patentability for application No. PCT/US2020/066279, issued Jun. 13, 2023, 11 pages.
Notice of Grant of NL application No. 2029658, Dutch Patent No. 2029658, issued Jun. 13, 2023, 6 pages.
"Intel Data Streaming Accelerator Preliminary Architecture Specification," retrieved from https://software.intel.com/sites/default/files/341204-intel-data-streaming-accelerator-spec-pdf on May 6, 2020, revision 1.0, Nov. 2019, 125 pages.
European Examination Report for app. no. 21198475.2, issued Jan. 4, 2024, 5 pages.
Extended European search report for application No. 23191363.3, issued Nov. 30, 2023, 11 pages.
Intel Corporation. Intel® Architecture Memory Encryption Technologies Specification. Ref: #336907-001US. Rev 1.1. Dec. 2017. (Year: 2017).
International Preliminary Report on Patentability and Written Opinion (International app. No. PCT/US2022/021446), issued Dec. 14, 2023, 5 pages.
International Preliminary Report on Patentability and written opinion (international application No. PCT/US2022/021531), issued Dec. 14, 2023, 5 pages.
International Search Report and Written Opinion issued on Jun. 30, 2022 for PCT/US2022/021531.
"Intel Data Streaming Accelerator Architecture Specification," Revision 1.2, 197 pages, Sep. 2021.
"Intel® QuickAssist Technology (Intel® QAT)—Data Center Performance," downloaded Jun. 12, 2022, from "https://www.intel.com/content/www/us/en/architecture-and-technology/intel-quick-assist-technology-overview.html," 6 pages.
"Smart Data Accelerator Interface ("SDXI") Specification," Version 0.9.0 rev 1, SNIA Advancing Storage & Information Technology, 109 pages.
International Search Report for application No. PCT/US2022/047184, issued Feb. 15, 2023, 3 pages.
Iyer, Shyamkumar, "Introducing Smart Data Acceleration Interface (SDXI)," In-Memory Computing Summit (Oct. 28, 2020).
J. Won, A. Singla, E. Bertino and G. Bollella, "Decentralized Public Key Infrastructure for Internet-of-Things," MILCOM 2018—2018 IEEE Military Communications Conference (MILCOM), Los Angeles, CA, USA, 2018, pp. 907-913.
Final Office Action issued in U.S. Appl. No. 17/133,627, issued Aug. 5, 2024, 27 pages.
Non-Final Office Action in U.S. Appl. No. 17/711,928, mailed Aug. 26, 2024, 22 pages.
Partial European Search Report for application No. 23156058.2, issued Jul. 26, 2023, 14 pages.
International Search Report and Written Opinion issued on Jun. 24, 2022 for PCT/US2022/021446.
Extended European Search Report for Application No. 22188184.0-1224, issued Jan. 25, 2023, 8 pages.
U.S. Appl. No. 17/551,166, filed Dec. 14, 2021, Saurabh Gayen, Entire Document.
U.S. Appl. No. 17/711,928, filed Apr. 1, 2022, Narayan Ranganathan, Entire Document.
U.S. Appl. No. 17/854,159, filed Jun. 30, 2022, Utkarsh Y. Kakaiya, Entire Document.
U.S. Appl. No. 17/854,322, filed Jun. 30, 2022, Utkarsh Y. Kakaiya, Entire Document.
U.S. Appl. No. 17/875,198, filed Jul. 27, 2022, Rajesh M. Sankaran, Entire Document.
European Search Report for application No. 23156058.2, issued Oct. 26, 2023, 13 pages.

(56) References Cited

OTHER PUBLICATIONS

Jiang, David, "Introducing the Intel Data Streaming Accelerator (Intel DSA)," retrieved on Dec. 1, 2021 from https://01.org/blogs/2019/introducing-intel-data-streaming-accelerator.

M. Werner, T. Unterluggauer, R. Schilling, D. Schaffenrath and S. Mangard, "Transparent memory encryption and authentication," 2017 27th International Conference on Field Programmable Logic and Applications (FPL), Ghent, Belgium, 2017, pp. 1-6.

Smart Data Accelerator Interface ("SDXI") Specification, Version 1.0, SNIA, Nov. 28, 2022, 144 pages.

Unterluggauer T, Werner M, Mangard S. MEAS: memory encryption and authentication secure against side-channel attacks. J Cryptogr Eng. 2019;9(2):137-158. doi: 10.1007/s13389-018-0180-2. Epub Jan. 25, 2018. PMID: 31231603; PMCID: PMC6555441.

Written Opinion for application No. PCT/US2022/047184, issued Feb. 15, 2023, 6 pages.

Written Opinion of the International Searching Authority for International application No. PCT/US2022/038546, mailed Nov. 18, 2022, 5 pages.

Intel® Architecture Memory Encryption Technologies Specification, Revision 1.3, Apr. 2021.

Samsung Unveils Industry-First Memory Module Incorporating New CXL interconnect Standard, May 11, 2021, downloaded Jun. 13, 2021, from https://news.samsung.com, 5 pages.

European Patent Office examination report for Application No. 22188184.0, issued Jul. 22, 2024, 5 pages.

Office Action issued in U.S. Appl. No. 17/357,973, on Oct. 1, 2024, 14 pages.

International Search Report for application No. PCT/CN2022/080895, 4 pages.

Written Opinion for application No. PCT/CN2022/080895, mailed Nov. 28, 2022, 4 pages.

Search report issued by the Dutch patent office per EPO report (application 2029658), dated Mar. 22, 2023, 11 pages (with machine translation of cover letter).

Non-final Office Action issued in U.S. Appl. No. 17/133,627, on Feb. 15, 2024, 23 pages.

Extended European Search Report issued on Feb. 28, 2022 for EP Application No. 21198475.2.

Gunlu, Onur, et al. "Secure and Reliable Key Agreement with Physical Unclonable Functions," Entropy 2018, vol. 20, May 3, 2018, pp. 1-19.

Intel Architecture Memory Encryption Technologies, Document No. 336907-003US, Apr. 2021.

International Search Report and Written Opinion issued by KIPO on Oct. 28, 2021 for corresponding PCT/US2020/066279, 18 pages.

Notice of Allowance issued on Aug. 30, 2021 for U.S. Appl. No. 16/832,138.

European Search Report for application No. 22188217.8-1203, issued Feb. 3, 2023, 16 pages.

European Search Report, Application No. EP22181090, issued Dec. 7, 2022, 7 pages.

Extended European Search Report for application No. 22188217.8, issued May 8, 2023, 13 pages.

European Search Report and Search Opinion, EP App. No. 22188184.0, Jan. 25, 2023, 8 pages.

Office Action, EP App. No. 22188184.0, Jul. 22, 2024, 5 pages.

European Examination Report for application No. 22181090.6, issued Oct. 9, 2024, 7 pages.

Non-final office action for U.S. Appl. No. 17/358,238, mailed Aug. 8, 2024, 30 pages.

Non-Final Rejection in U.S. Appl. No. 17/483,123, mailed Nov. 25, 2024,. 9 pages.

* cited by examiner

100
Core
102
101
101
Host SAD
CHA
SLICE 0
106-1
Host SAD
CHA
SLICE 1
106-2
Host SAD
CHA
SLICE N
106-M
FlexBus IO Port (x16 instance)
101
104-1
HDM Address Decoder
108-1
Port-0 (x4)
Port-1 (x4)
Port-2 (x4)
Port-3 (x4)
101
CXL Type-2 Device(s) 101-1
FlexBus IO Port (x16 instance)
101
104-N
HDM Address Decoder
108-N
Port-0 (x4)
Port-1 (x4)
Port-2 (x4)
Port-3 (x4)
101
CXL Type-2 Device(s) 101-N

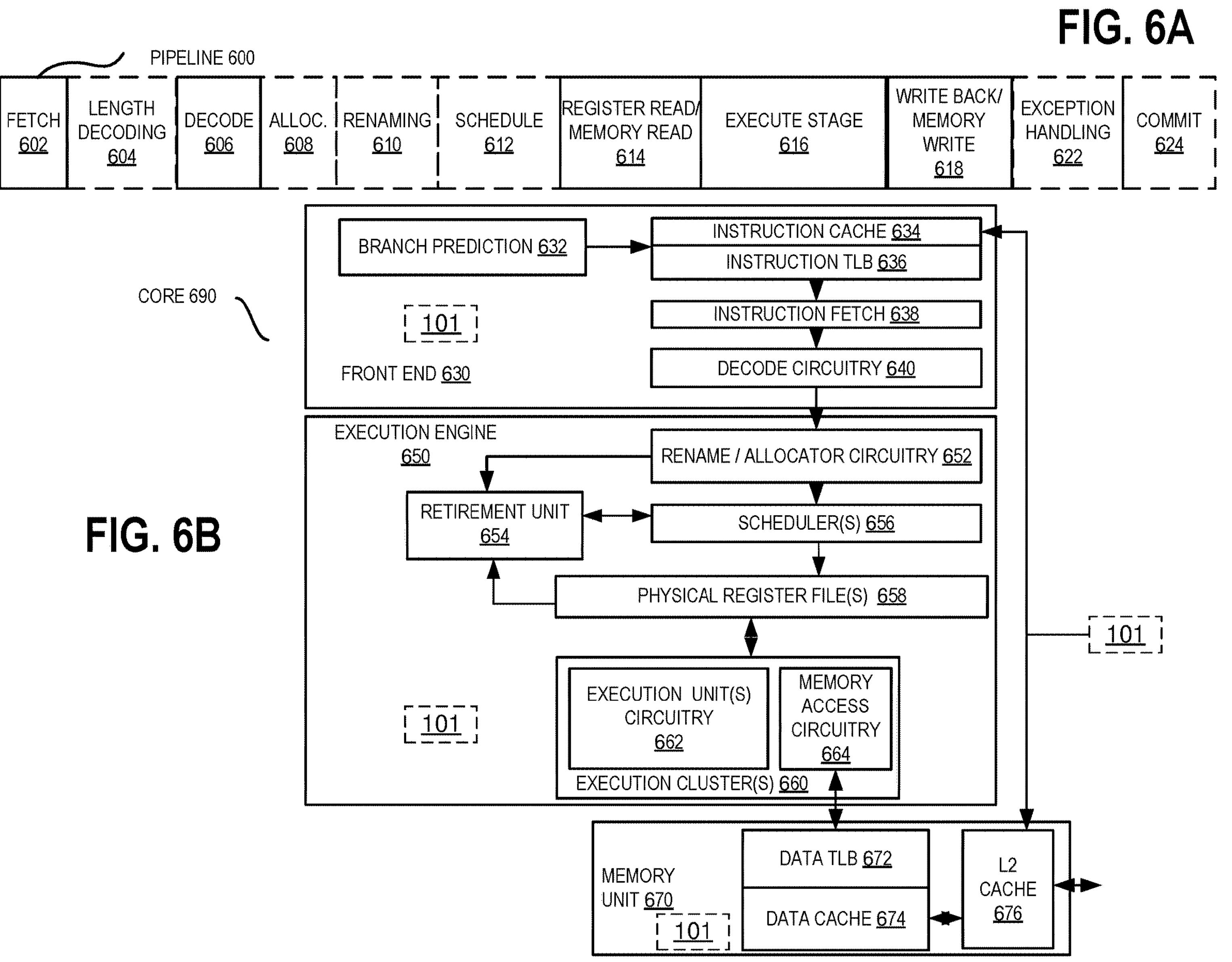
FIG. 6A
PIPELINE 600
FETCH 602
LENGTH DECODING 604
DECODE 606
ALLOC. 608
RENAMING 610
SCHEDULE 612
REGISTER READ/ MEMORY READ 614
EXECUTE STAGE 616
WRITE BACK/ MEMORY WRITE 618
EXCEPTION HANDLING 622
COMMIT 624
FIG. 6B
CORE 690
BRANCH PREDICTION 632
INSTRUCTION CACHE 634
INSTRUCTION TLB 636
INSTRUCTION FETCH 638
DECODE CIRCUITRY 640
101
FRONT END 630
EXECUTION ENGINE 650
RENAME / ALLOCATOR CIRCUITRY 652
RETIREMENT UNIT 654
SCHEDULER(S) 656
PHYSICAL REGISTER FILE(S) 658
101
EXECUTION UNIT(S) CIRCUITRY 662
MEMORY ACCESS CIRCUITRY 664
EXECUTION CLUSTER(S) 660
101
MEMORY UNIT 670
101
DATA TLB 672
DATA CACHE 674
L2 CACHE 676

SCALABLE ADDRESS DECODING SCHEME FOR CXL TYPE-2 DEVICES WITH PROGRAMMABLE INTERLEAVE GRANULARITY

FIELD

The present disclosure generally relates to the field of electronics. More particularly, an embodiment relates to a scalable address decoding scheme for Compute Express Link™ (CXL™) Type-2 devices with programmable interleave granularity.

BACKGROUND

Compute Express Link™ or CXL™ is an open standard interconnection for high-speed processor or CPU (central processing unit) to device and to memory communication, designed to accelerate next-generation data center performance. CXL is built on the Peripheral Component Interconnect express (PCIe) physical and electrical interface with protocols in three key areas: Input/Output ("I/O" or "IO"), memory, and cache coherence.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 6A is a block diagram illustrating both an exemplary in-order pipeline and an exemplary register renaming, out-of-order issue/execution pipeline according to embodiments.

FIG. 6B is a block diagram illustrating both an exemplary embodiment of an in-order architecture core and an exemplary register renaming, out-of-order issue/execution architecture core to be included in a processor according to embodiments.

DETAILED DESCRIPTION

Figure 1:
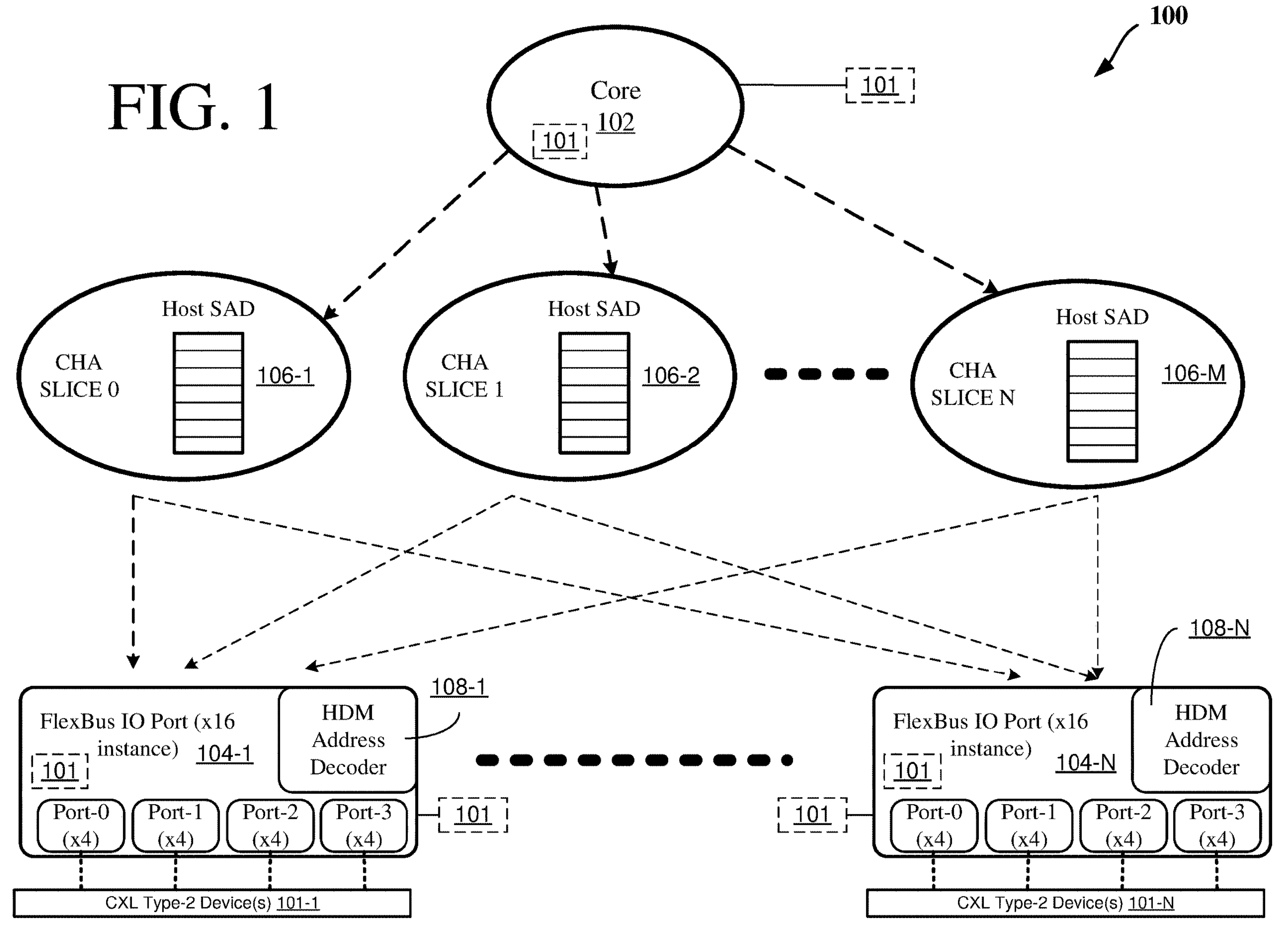
FIG. 1 illustrates a block diagram of a system, which can be used to implement one or more embodiments.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, CXL can be used for high-speed processor/CPU to device and to memory communication. Moreover, some current generation server CPUs use a flat address decoding scheme that requires the CPU silicon to support one System Address Decoder (SAD) rule per CXL Type-2×16 device (where "×16" refers to 16 data lanes). For example, in some server processors, six SAD rules may be used to map six ×16 CXL Type-2 devices as independent, physical address ranges in the system memory map. These address ranges are non-interleaved. However, future server/standalone CPUs will need to support enhanced CXL functionality (e.g., increasing the number of CXL×16 ports, ×4/×8 devices (where ×4 and ×8, respectively refer to four data lanes and eight data lanes), etc.).

Using flat address decoding necessitates that the number of SAD rules increase from generation to generation, presenting a scalability issue, for example: (a) the need to predict future use models and estimate the number of CXL Type-2 devices per socket, which can be challenging due to a rapidly evolving CXL ecosystem; and/or (b) to account for new usage models, it is standard practice to account for architectural headroom, by being conservative and the upsizing number of SAD rules required for CXL Type-2 devices in worst-case configurations. The net effect of using the flat address decoding approach is an increase in the number of SAD rules that CPU silicon provisions to account for worst-case use models. This increases memory latency since SAD rules are in the critical latency path of all memory requests.

To this end, some embodiments provide a scalable address decoding scheme for CXL Type-2 devices with programmable interleave granularity. An embodiment addresses a scalability issue with provisioning System Address Decoders rules (a.k.a. SAD rules, host SAD rules, or more generally address decoders) to map multiple CXL Type-2 devices in a CPU/processor socket. Some embodiments may be implemented without any coherent cache memory and implemented by utilizing host managed memory. Also, while some embodiments are discussed with reference to CXL, embodiments are not limited to this and any coherent or non-coherent interconnect/interface (including, for example, PCIe, Ultra Path Interconnect (UPI), Gen-Z fabric/protocol, Open Coherent Accelerator Processor Interface (OpenCAPI), Cache Coherent Interconnect for Accelerators (CCIX), NVidia® link (NVLink™), HyperTransport™ interconnect, etc.) may be used in place of or in combination with the CXL.

By contrast, a flat address decoding scheme will need each CXL×16 Type-2 device to use a separate SAD rule (with no interleaving) to map it to the system memory, resulting in: (1) higher memory latency: flat address decoding results in an increased number of SAD rules per CPU socket; in turn, this adversely affects memory latency, since SAD rules are in the critical latency path of all memory requests; and/or (2) reduced configuration flexibility: flat address decoding requires hardware to provision a fixed number of SAD rules for mapping CXL Type-2 devices, and the number of SAD rules dictate the maximum number of CXL Type-2 devices which can be attached to a socket, thus severely limiting flexibility post-launch.

Moreover, an embodiment provides a single (or at least a reduced number of) CXL Type-2 SAD rule(s) at the host SAD with a dynamically programmable Interleave Granularity (IG). A Single CXL Type-2 SAD rule at the host SAD Level maps the aggregate memory capacity required by all the CXL Type-2 devices within a processor socket. To support large memory sizes, one embodiment uses higher order physical address bits to interleave these devices. Further, since CXL Type-2 device memory sizes vary from device to device, at least one embodiment uses a programmable interleave granularity versus a fixed interleave granularity.

In an embodiment, during boot or even during runtime (such as when in System Management Mode (SMM)), software (e.g., an application with supervisory access, a secured driver, a kernel, an Operating System (OS), or other software with read/write access to configuration registers/storage structures discussed herein during system boot or runtime, etc.), Unified Extensible Firmware Interface (UEFI), BIOS (Basic Input Output System), other firmware (such as an Option Read Only Memory (Option ROM), secured firmware running on a device, Baseboard Management Controller (BMC) firmware, etc.), or other logic (collectively referred to herein as “configurator logic” 101 of FIG. 1 (which may be located in various locations, including, for example, as shown in FIG. 1 et seq. in various embodiments) dynamically determines the appropriate interleave granularity based on the size and number of populated devices and initializes or configures the processor hardware accordingly. In contrast, prior art uses multiple CXL Type-2 SAD rules.

Accordingly, some embodiments allow for generation to generation architectural scalability offering: (1) reduced memory latency for all transactions, where a single SAD rule (or at least a reduced number of SAD rules) is reserved for CXL Type-2 devices, resulting in a significantly lower number of SAD rule entries relative to prior solutions; in turn, this benefits latency profile for all memory bound transactions (including non-CXL targets such as Double Data Rate (DDR) memory, HBM, etc.) and improving overall system performance without additional overhead; and/or (2) in-field configuration flexibility, allowing end users to determine/vary the number of CXL Type-2 devices to be populated for their platform offerings post-launch in-field, instead of having to make an up-front decision ahead of productization.

FIG. 1 illustrates a block diagram of a system 100, which can be used to implement one or more embodiments. For example, FIG. 1 shows a sample flow of transactions from the processor core (or more simply “core”) 102 to CXL Type-2 memory device(s) 103, which are coupled to the system 100 via IO ports 104-1 . . . 104-N. While some embodiments are discussed with reference to ×16 instances, embodiments are not limited to this and different number of lanes may be used for the IO devices/ports (such as ×4, ×8, ×32, ×64, ×128, etc.). Also, FlexBus™ is shown as an option since it is a multi-protocol aware high speed bus and can operate with CXL, PCIe, or UPI; however, embodiments are not limited to using FlexBus and other types of protocols/busses/interconnects may be used.

In an embodiment, a memory access transaction (e.g., a read or write transaction) to a CXL Type-2 address range consists of the following stages (taking a memory read operation/transaction as an example): (a) Address Map Lookup: a read transaction is first routed to the appropriate Cache and Home Agent (CHA) 106-1 to 106-M slice (e.g., on the uncore fabric); (b) CHA Address Decode: once the transaction reaches the CHA, the SAD rule(s) in the CHA pipeline generate the ID (Identifier) of the specific CXL agent (×16) targeted by this particular transaction and routes it to that specific CXL×16 agent; and (c) CXL Agent or Host-Managed Device Memory (HDM) Address Decode (e.g., 108-1 . . . 108-N): the CXL agent/endpoint hosts the target CXL Type-2 device which, in turn, hosts the physical address being requested by the transaction initiated by the core 102. In various embodiments, the address map used under stage (a) above can be stored in any location that is accessible by decoder logic. Also, the read/write transaction may be initiated by a core (and the address map may be stored in the core or in memory/cache coupled to the core). Also, the SAD rule(s) may be stored in any memory device accessible by the CHA, a fabric bridge logic, or any logic in the path of a transaction (including logic near or coupled to a processor core).

As shown in FIG. 1, each agent (i.e., 104-1 to 104-N) can have up to 4×4 devices connected to it in this example (although embodiments are not limited to ×4 devices and devices with a different number of lanes may be used, as discussed herein). The transaction goes through the HDM decoder stage implemented at the CXL agent level (labeled as HDM address decoder 108-1 to 108-N in FIG. 1). The HDM decoder generates the correct (×4) Port ID that the transaction is targeting. The transaction is then routed to the correct ×4 port, following which the end point device (e.g., one of devices 103-1 . . . 103-N) returns the requested data back to the core 102.

In some current processors, six entries may be reserved for CXL Type-2 devices in the CHA SAD rules. In this scheme, to support CXL Type-2 devices behind any CXL ports of a socket, the number of SAD rule Entries required is equal to the number of CXL ports, with each SAD rule targeting a unique CXL Type-2 device in the socket. In this example, only 6 CXL Type-2 devices can be supported per socket. If more CXL Type-2 devices are desired, then additional SAD rule entries need to be provisioned in the hardware. The CHA SAD rules are in the critical latency path to memory, and all transactions are required to pass-through this pipeline. Hence, any increase in the number of SAD rule entries increases the latency of all memory-bound transactions (including non-CXL memory ranges), adversely affecting overall system performance.

To this end, in one embodiment, a single CXL Type-2 SAD rule entry at the host SAD level is reserved for CXL Type-2 devices, irrespective of the number of Type-2 devices attached to the socket. This addresses the fundamental scalability problem. This CXL Type-2 SAD rule maps the aggregate memory size required by all CXL-Type-2 devices in the socket and interleaves them using higher order physical address bits. The interleaving granularity may be determined dynamically and programmed (e.g., by configurator logic 101) at boot time or during runtime (as discussed before) depending on device population.

Figure 2:
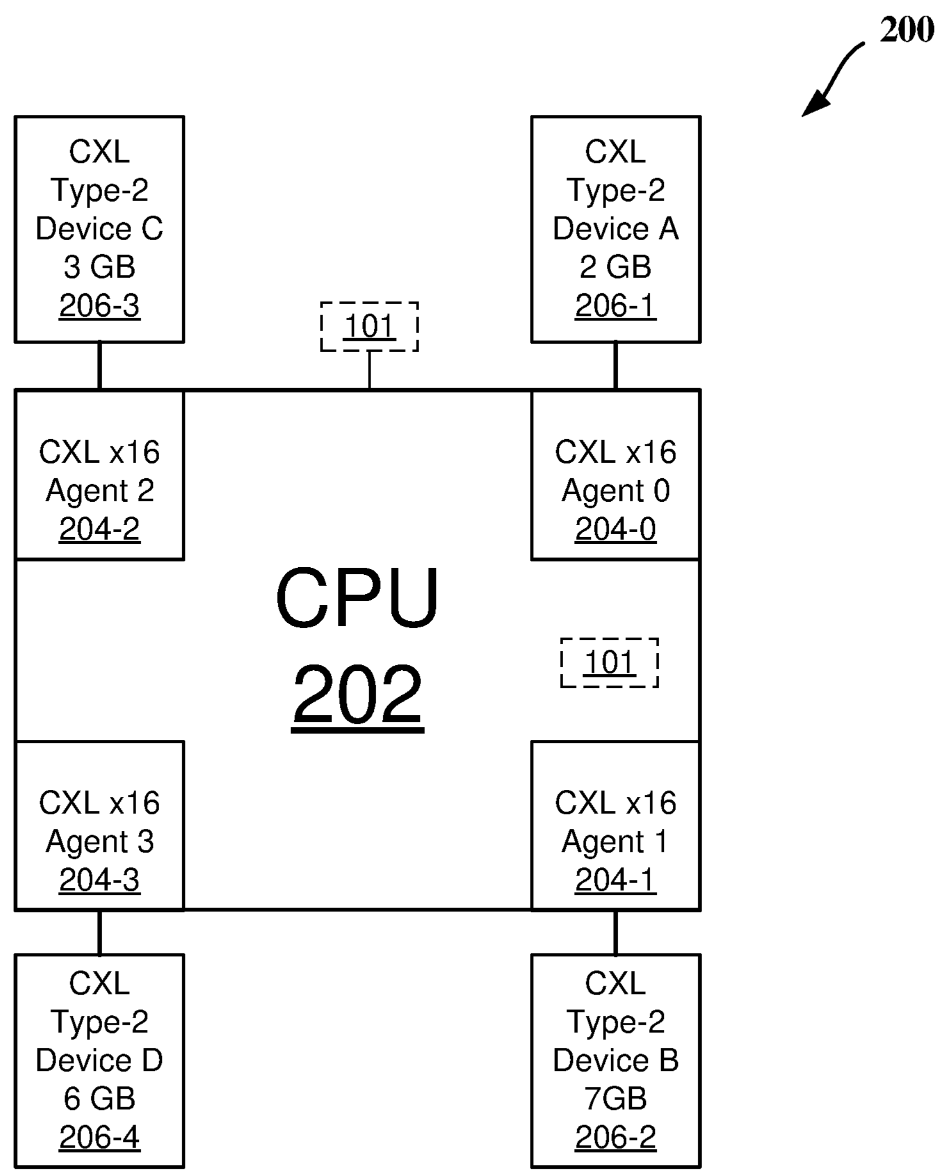
FIG. 2 illustrates a block diagram of processor sockets with multiple devices having variable memory capacities, which may be used by one or more embodiments.

FIG. 2 illustrates a block diagram of processor sockets 200 with multiple CXL Type-2 devices having variable memory capacities, which may be used by one or more embodiments. FIG. 2 shows how one or more embodiments may be implemented at the platform level.

As shown in FIG. 2, a CPU/processor 202 includes four CXL ×-16 Agents (204-0 . . . 204-3), whereby each agent has CXL Type-2 devices (206-1 . . . 206-4) attached, with variable memory capacities of 2 GB (Agent 0), 7 GB (Agent 1), 3 GB (Agent 2), 6 GB (Agent 3). While the CXL Type-2 devices (206-1 . . . 206-4) have differing memory capacities, embodiments are not limited to this and two or more of the CXL Type-2 devices may be of the same size.

Figure 3:
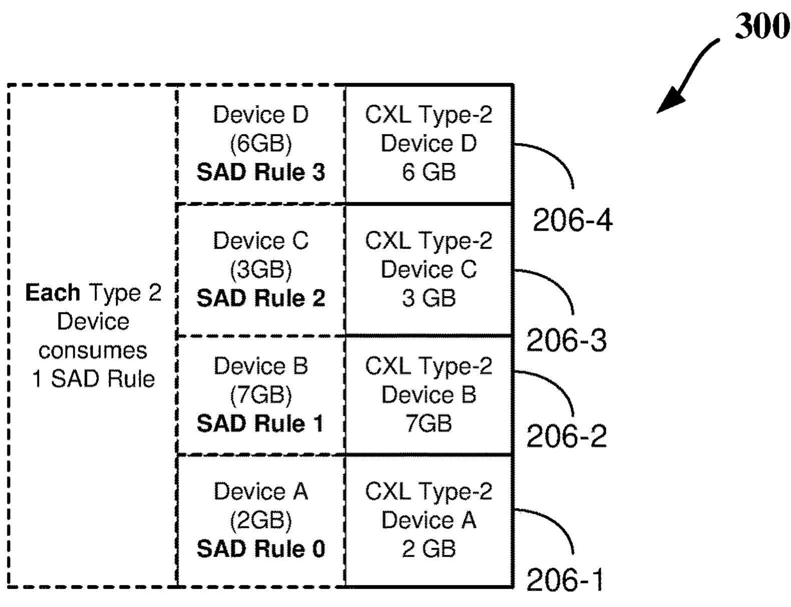
FIGS. 3 and 4 illustrate sample system address map configurations, which may be used in one or more embodiments.
Figure 4:
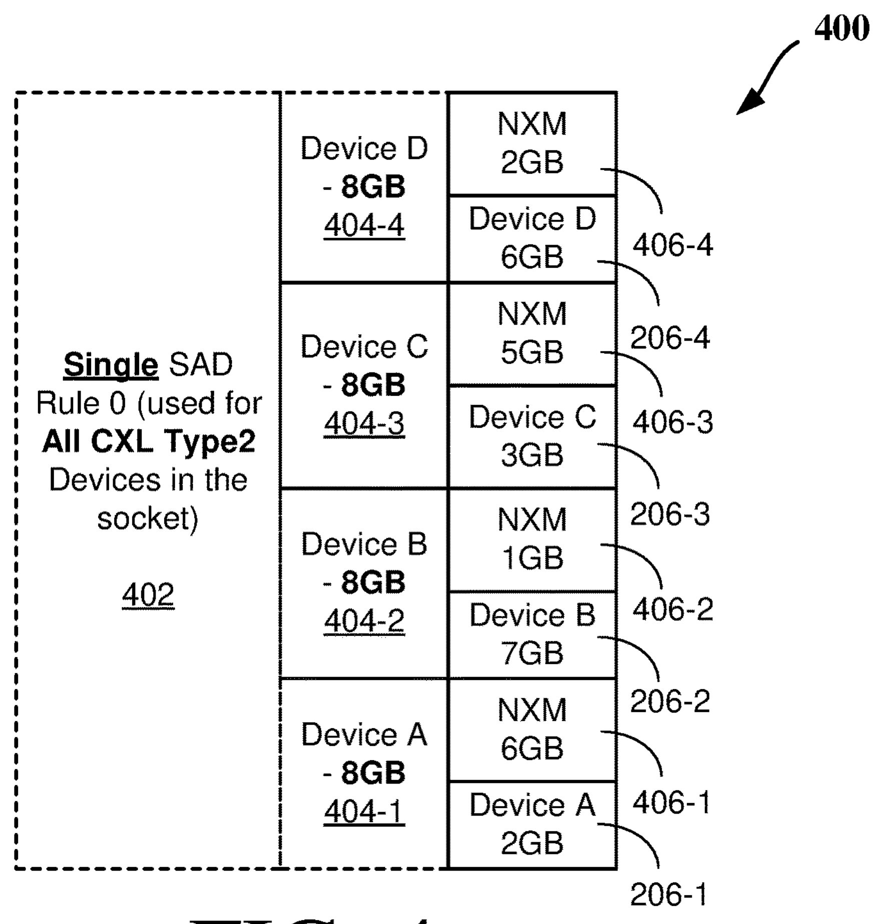

FIGS. 3 and 4 illustrate sample system address map configurations 300 and 400, which may be used in one or more embodiments. In some current implementations, the above-discussed population of FIG. 2 would be mapped to the address space as separate, non-interleaved address ranges, such as shown in FIG. 3. As a result, each Type-2 device consumes a separate, non-interleaved SAD rule (e.g., for a total 18 GB address space for the four CXL devices of the example shown in FIG. 3), and hence presents a scalability issue as previously noted.

FIG. 4 illustrates a sample system address map configuration 400, according to an embodiment. By contrast, configuration 400 only uses a single SAD rule 402 (e.g., for all or at least a plurality of CXL Type-2 devices 206-1 . . . 206-4 in the socket), which may be stored in the one or more of the CHA slices 0 to M. Also, in at least one embodiment, the devices 206-1 to 206-4 are coupled to the processor socket via one or more hierarchy of switches. In the example of FIG. 4, the total address space for the four devices 206-1 . . . 206-4 is 32 GB, with 8 GB of higher order physical address bits (e.g., PA[33:33] or A[33:33], where "PA" and "A" both refer to Physical Address), which are interleaved and scalable. Non-Existent Memory (NXM) devices 406-1 to 406-4 may take up the reminder capacity of 8 GB per device, as will be further discussed herein, e.g., with reference to FIG. 5. In an embodiment, the higher order (rather than the lower order) address bits are used, in part, because the lower order address bits may be in use for addressing. Embodiments are not limited to using the higher order address bits, however, and other address bits (e.g., specific bits, lower bits, etc.) may be used depending on the implementation.

Figure 5:
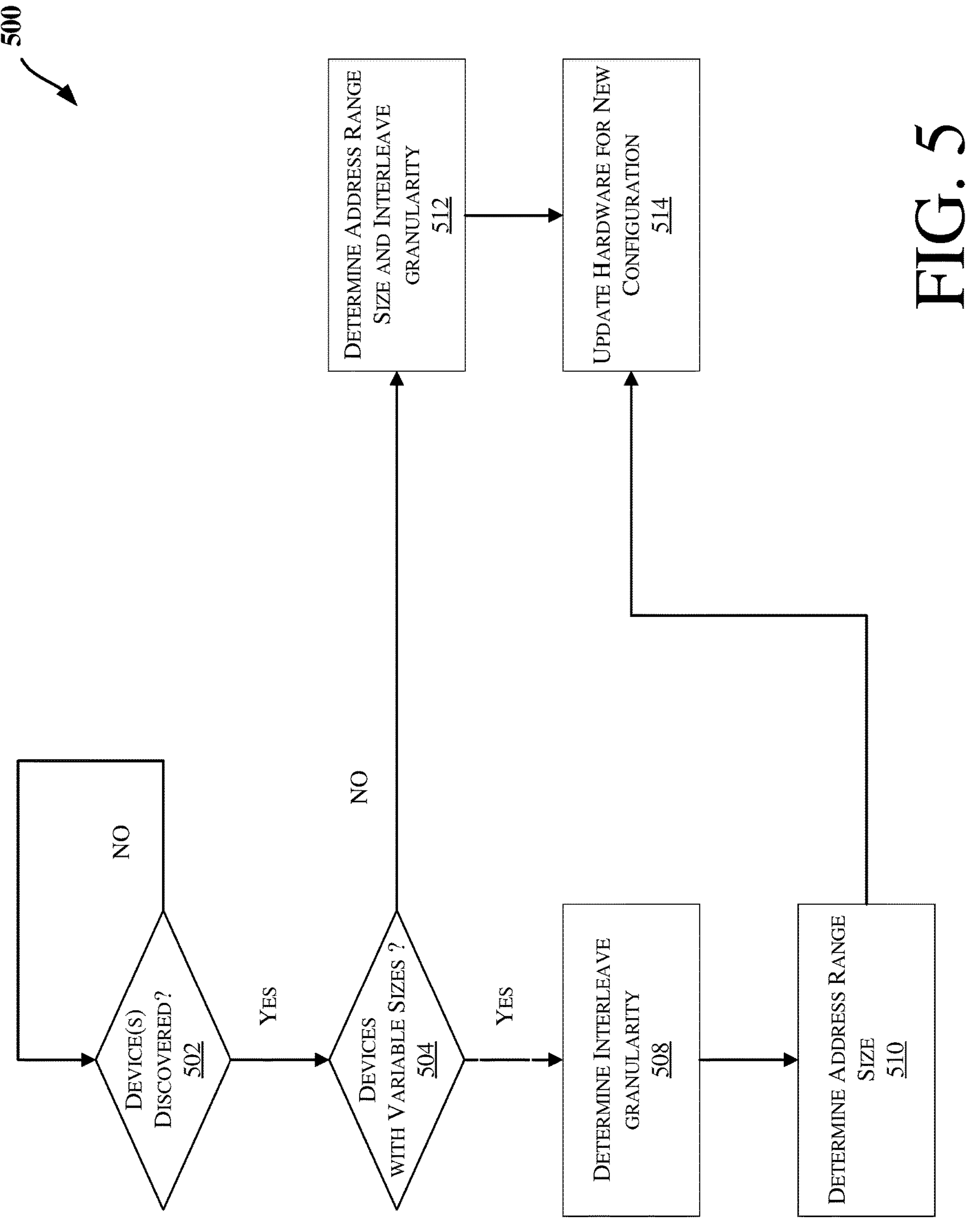
FIG. 5 illustrates a flow diagram of a method to provide a scalable address decoding scheme for devices with programmable interleave granularity, according to an embodiment.

More particularly, FIG. 5 illustrates a flow diagram of a method 500 to provide a scalable address decoding scheme for CXL type-2 devices with programmable interleave granularity, according to an embodiment. One or more operations of method 500 may be performed by one or more components of FIGS. 1-4, including, for example, the configuration logic 101.

Referring to FIGS. 1-5, at an operation 502, logic (such as discovery logic which may be implemented as part of configuration logic 101, processor 102, etc.) discovers CXL Type-2 device population and capacities, e.g., at boot time or during runtime (as discussed above). At operation 504, when the single CXL Type-2 SAD 402 rule maps to variable sized CXL devices (206-1 to 206-N) and they need to be interleaved, logic (such as configuration logic 101, processor 102, etc.) determines the interleave granularity at operation 508 and the proper address range size at operation 510 for the configuration. These values can vary based on CXL Type-2 device configuration and, hence, can be dynamically computed, e.g., during runtime, at boot, etc. by a software agent with appropriate permission level.

At operation 508, logic (such as configuration logic 101, processor 102, etc.) computes the interleave granularity of the CXL Type-2 address range by:

(a) using the memory size of the largest device in the discovered population (i.e., Device B 206-2 requiring 7 GB of memory in the example of FIGS. 1-4) as a starting point; hence, IG would be greater or equal to 7 GB (which is a non-power-of-2 value) in this example; and (b) since memory interleaving can be more efficient if done using powers-of-2 granularities (e.g., to allow for simpler pipeline logic and lower path delays and, hence, better for performance), logic ((such as configuration logic 101, processor 102, etc.) pads additional capacity as a "filler" range to the maximum sized device capacity discovered at operation 502 (e.g., in the example of FIGS. 1-4, the next higher power-of-2 for a 7 GB device would be 8 GB; therefore, the computed IG at operation 508 would be 8 GB, which corresponds to the higher order physical address bits (e.g., PA[33:33]), where the extra 1 GB (i.e., 8 GB-7 GB) is considered as "physical address padding" and is termed as NXM, but different devices can have different amounts of address padding, as shown in FIG. 4).

At operation 510, logic (such as configuration logic 101, processor 102, etc.) to computes the size of the Type-2 address range. In the example of FIGS. 1-4, there are four CXL Type 2 devices 206-1 to 206-4 (i.e., NUM_CXL_TYPE2_DEVICES=4). The IG (after padding 1 GB) has been previously determined as 8 GB from operation 508. Therefore, SAD rule Size=IG*NUM_CXL_TYPE2_DEVICES=8 GB*4=32 GB.

Alternatively, at operation 504, when the single CXL Type-2 SAD 402 rule maps to the same sized CXL devices (206-1 to 206-N), logic (such as configuration logic 101, processor 102, etc.) determines the interleave granularity and the proper address range size for the configuration at operation 512. This interleave granularity would still be determined in the same fashion as at operation 508, i.e., by determining the capacity of at least one of the CXL devices (since all devices have the same size) and padded to the next power of 2. The address range size would be determined in a similar fashion as operation 510, i.e., by multiplying the number of devices with the interleave granularity value.

At operation 514, logic (such as configuration logic 101, processor 102, etc.) programs/updates the hardware for the new configuration determined by operations 508-510 or 512. In an embodiment, logic (such as configuration logic 101, processor 102, etc.) programs the processor Control and Status Registers (CSRs). More particularly, the single SAD rule 402 maps to all CXL Type-2 devices. In the example of FIGS. 1-4 and variable size CXL devices:

SAD rule Size=32 GB; and

SAD rule Interleave Granularity=8 GB based on Address Bit[33]

As mentioned above, due to differing device capacities, variable sized NXM address reserved/unused regions are created in the address map (see, e.g., FIG. 4). These NXM regions are reported as unusable/reserved/padded ranges by logic (such as configuration logic 101, processor 102, etc.) to the operating system, for example, via one or more registers (such as CSR registers), one or more tables (such as Coherent Device Attribute Table (CDAT), CXL Early Discovery Table (CEDT), etc.), Advanced Configuration and Power Interface (ACPI) tables, one or more structures (such as CXL Fixed Memory Window Structures (CFMWS)), etc.

Moreover, the filler ranges used for the IG determinations are referred to herein as NXM regions and may exist purely for alignment purposes (shown as items 406-1 to 406-4 in FIG. 4). Further, a requesting agent could misdirect transactions targeting NXM ranges. To avoid OS errors, standard NXM behavior can be implemented by the CXL agent as: (1) read transactions to NXM regions return an all 1's (or all 0's) pattern (or some other designated value indicative of the NXM regions being inaccessible); and (2) write transactions to NXM regions are silently (e.g., without any error messages) dropped or alternatively a message is returned that the address is invalid.

Accordingly, in one or more embodiments, a single CXL Type-2 SAD rule is allocated/mapped per socket. The Type-2 devices are interleaved using higher order address bits, and interleave granularity is dynamically computed/determined and initialized into the processor hardware (e.g., by configurator logic 101) at boot time or during runtime (as discussed above), based on the discovered device population.

Additionally, some embodiments may be applied in computing systems that include one or more processors (e.g., where the one or more processors may include one or more processor cores), such as those discussed with reference to FIG. 1 et seq., including for example a desktop computer, a workstation, a computer server, a server blade, or a mobile computing device. The mobile computing device may include a smartphone, tablet, UMPC (Ultra-Mobile Personal Computer), laptop computer, Ultrabook™ computing device, wearable devices (such as a smart watch, smart ring, smart bracelet, or smart glasses), etc.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU (Central Processing Unit) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

FIG. 6A is a block diagram illustrating both an exemplary in-order pipeline and an exemplary register renaming, out-of-order issue/execution pipeline according to embodiments. FIG. 6B is a block diagram illustrating both an exemplary embodiment of an in-order architecture core and an exemplary register renaming, out-of-order issue/execution architecture core to be included in a processor according to embodiments. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a writemask registers unit, and a scalar registers unit. These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 6) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 690 includes logic to support a packed data instruction set extension (e.g., AVX1, AVX2), thereby allowing the operations used by many multimedia applications to be performed using packed data.

Figure 7:
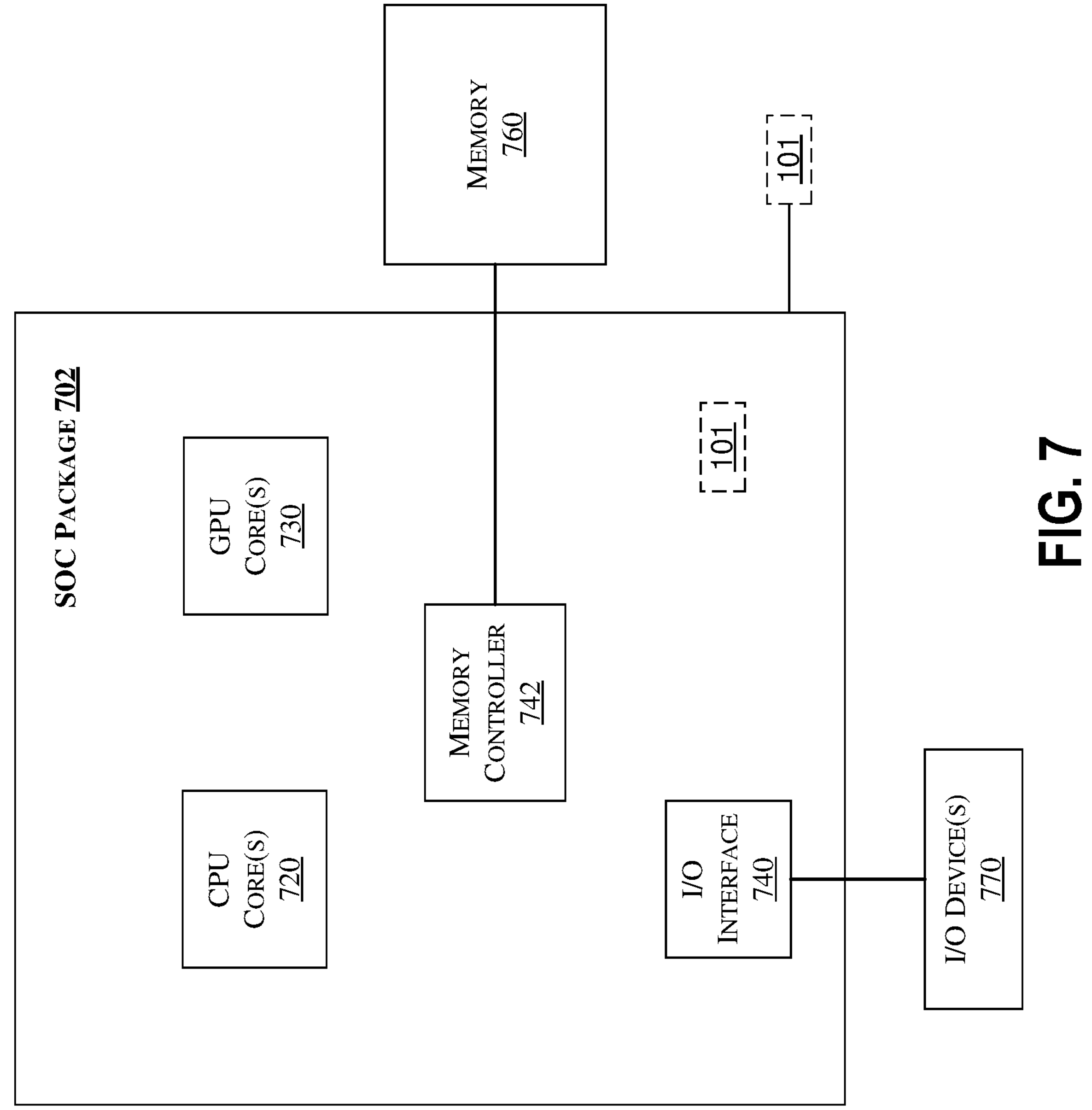
FIG. 7 illustrates a block diagram of an SOC (System On Chip) package in accordance with an embodiment.

FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 702 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like.

Figure 8:
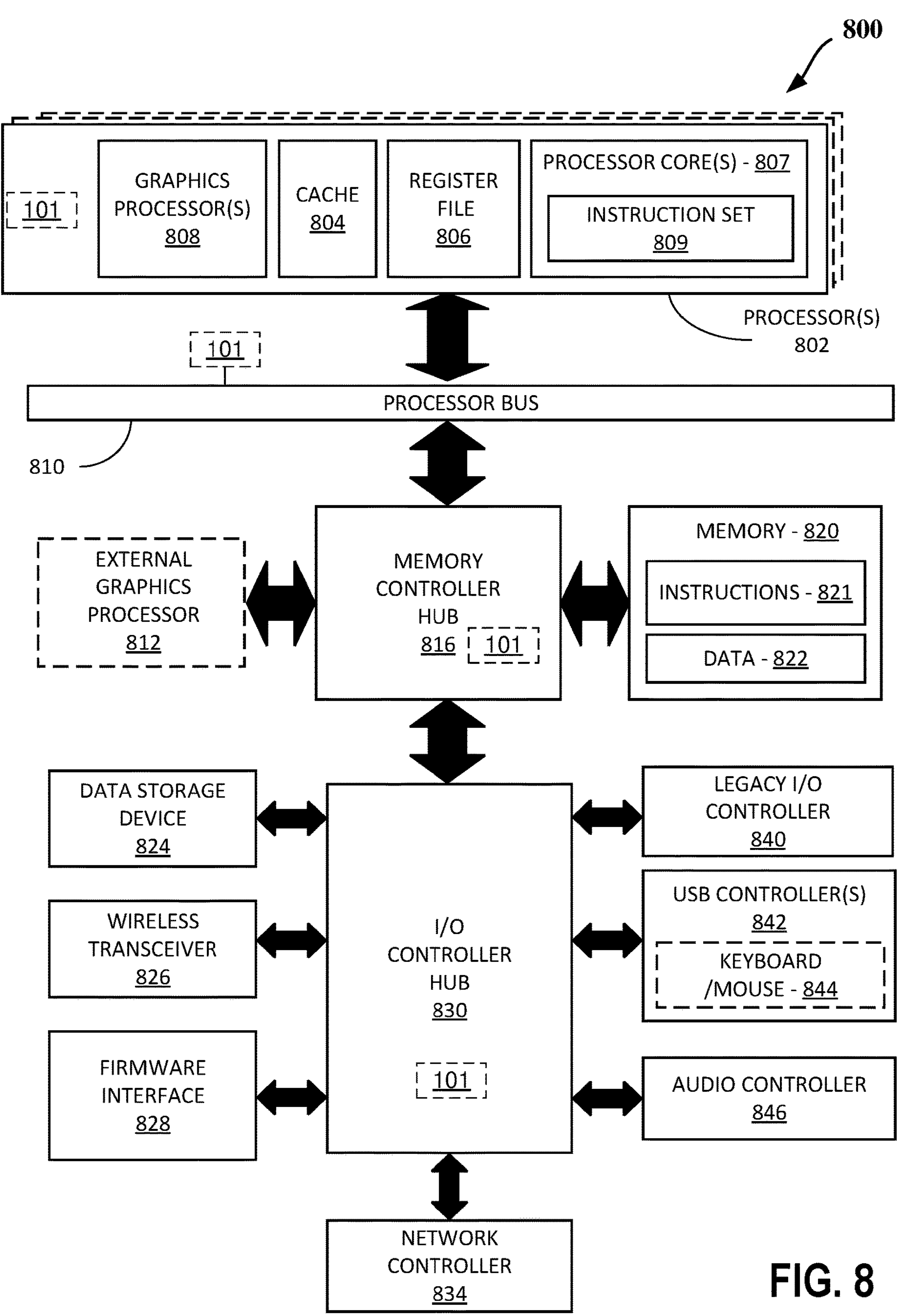
FIG. 8 is a block diagram of a processing system, according to an embodiment.

FIG. 8 is a block diagram of a processing system 800, according to an embodiment. In various embodiments the system 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include, or be incorporated within a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled to a processor bus 810 to transmit communication signals such as address, data, or control signals between processor 802 and other components in system 800. In one embodiment the system 800 uses an exemplary 'hub' system architecture, including a memory controller hub 816 and an Input Output (I/O) controller hub 830. A memory controller hub 816 facilitates communication between a memory device and other components of system 800, while an I/O Controller Hub (ICH) 830 provides connections to I/O devices via a local I/O bus. In one embodiment, the logic of the memory controller hub 816 is integrated within the processor.

Memory device 820 can be a dynamic random access memory (DRAM) device, a static random access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations.

In some embodiments, ICH 830 enables peripherals to connect to memory device 820 and processor 802 via a high-speed I/O bus. The I/O peripherals include, but are not limited to, an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 810. It will be appreciated that the system 800 shown is exemplary and not limiting, as other types of data processing systems that are differently configured may also be used. For example, the I/O controller hub 830 may be integrated within the one or more processor 802, or the memory controller hub 816 and I/O controller hub 830 may be integrated into a discreet external graphics processor, such as the external graphics processor 812.

Figure 9:
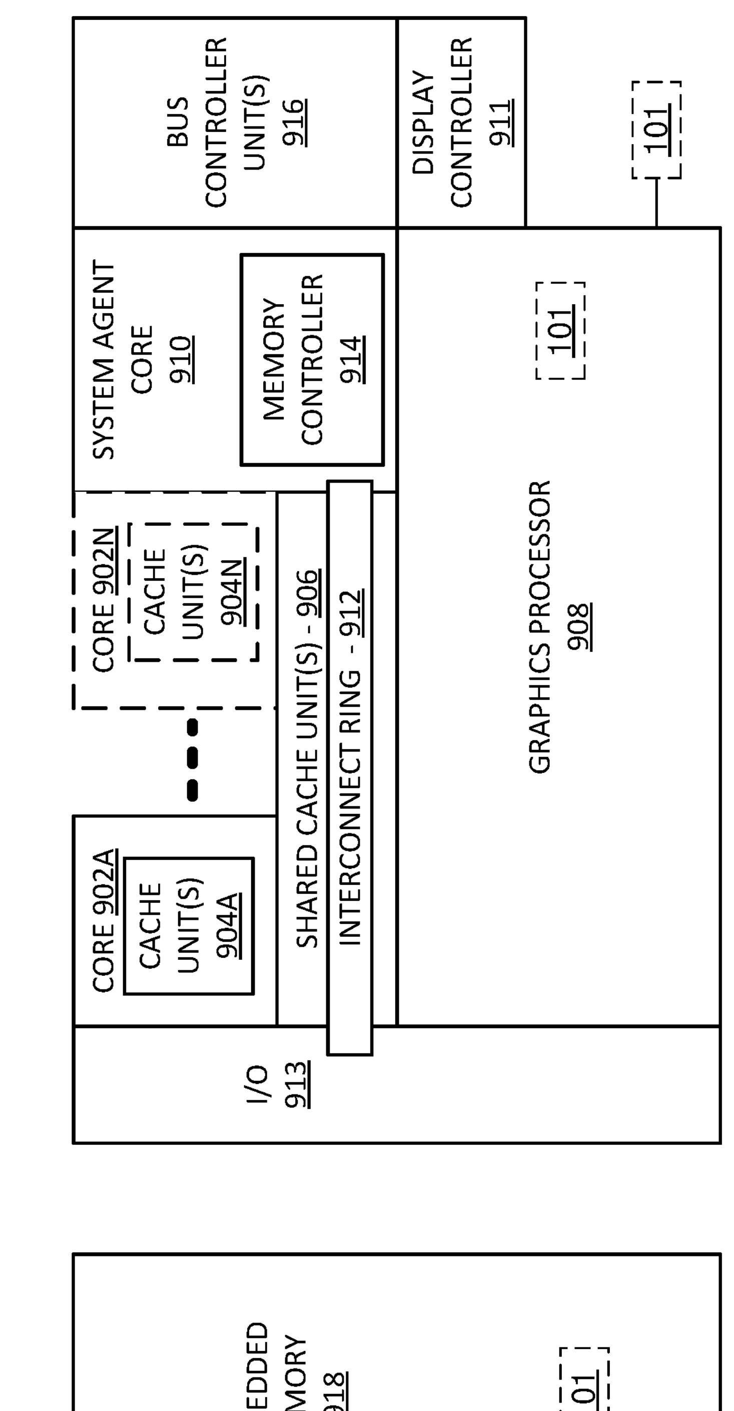
FIG. 9 is a block diagram of an embodiment of a processor having one or more processor cores, according to some embodiments.

FIG. 9 is a block diagram of an embodiment of a processor 900 having one or more processor cores 902A to 902N, an integrated memory controller 914, and an integrated graphics processor 908. Those elements of FIG. 9 having the same reference numbers (or names) as the elements of any other figure herein can operate or function in any manner similar to that described elsewhere herein, but are not limited to such. Processor 900 can include additional cores up to and including additional core 902N represented by the dashed lined boxes. Each of processor cores 902A to 902N includes one or more internal cache units 904A to 904N. In some embodiments each processor core also has access to one or more shared cached units 906.

The internal cache units 904A to 904N and shared cache units 906 represent a cache memory hierarchy within the processor 900. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 906 and 904A to 904N.

In some embodiments, processor 900 may also include a set of one or more bus controller units 916 and a system agent core 910. The one or more bus controller units 916 manage a set of peripheral buses, such as one or more Peripheral Component Interconnect buses (e.g., PCI, PCI Express). System agent core 910 provides management functionality for the various processor components. In some embodiments, system agent core 910 includes one or more integrated memory controllers 914 to manage access to various external memory devices (not shown).

In some embodiments, one or more of the processor cores 902A to 902N include support for simultaneous multi-threading. In such embodiment, the system agent core 910 includes components for coordinating and operating cores 902A to 902N during multi-threaded processing. System agent core 910 may additionally include a power control unit (PCU), which includes logic and components to regulate the power state of processor cores 902A to 902N and graphics processor 908.

In some embodiments, processor 900 additionally includes graphics processor 908 to execute graphics processing operations. In some embodiments, the graphics processor 908 couples with the set of shared cache units 906, and the system agent core 910, including the one or more integrated memory controllers 914. In some embodiments, a display controller 911 is coupled with the graphics processor 908 to drive graphics processor output to one or more coupled displays. In some embodiments, display controller 911 may be a separate module coupled with the graphics processor via at least one interconnect, or may be integrated within the graphics processor 908 or system agent core 910.

In some embodiments, a ring based interconnect unit 912 is used to couple the internal components of the processor 900. However, an alternative interconnect unit may be used, such as a point-to-point interconnect, a switched interconnect, or other techniques, including techniques well known in the art. In some embodiments, graphics processor 908 couples with the ring interconnect 912 via an I/O link 913.

The exemplary I/O link 913 represents at least one of multiple varieties of I/O interconnects, including an on package I/O interconnect which facilitates communication between various processor components and a high-performance embedded memory module 918, such as an eDRAM (or embedded DRAM) module. In some embodiments, each of the processor cores 902 to 902N and graphics processor 908 use embedded memory modules 918 as a shared Last Level Cache.

In some embodiments, processor cores 902A to 902N are homogenous cores executing the same instruction set architecture. In another embodiment, processor cores 902A to 902N are heterogeneous in terms of instruction set architecture (ISA), where one or more of processor cores 902A to 902N execute a first instruction set, while at least one of the other cores executes a subset of the first instruction set or a different instruction set. In one embodiment processor cores 902A to 902N are heterogeneous in terms of micro-architecture, where one or more cores having a relatively higher power consumption couple with one or more power cores having a lower power consumption. Additionally, processor 900 can be implemented on one or more chips or as an SoC integrated circuit having the illustrated components, in addition to other components.

Figure 10:
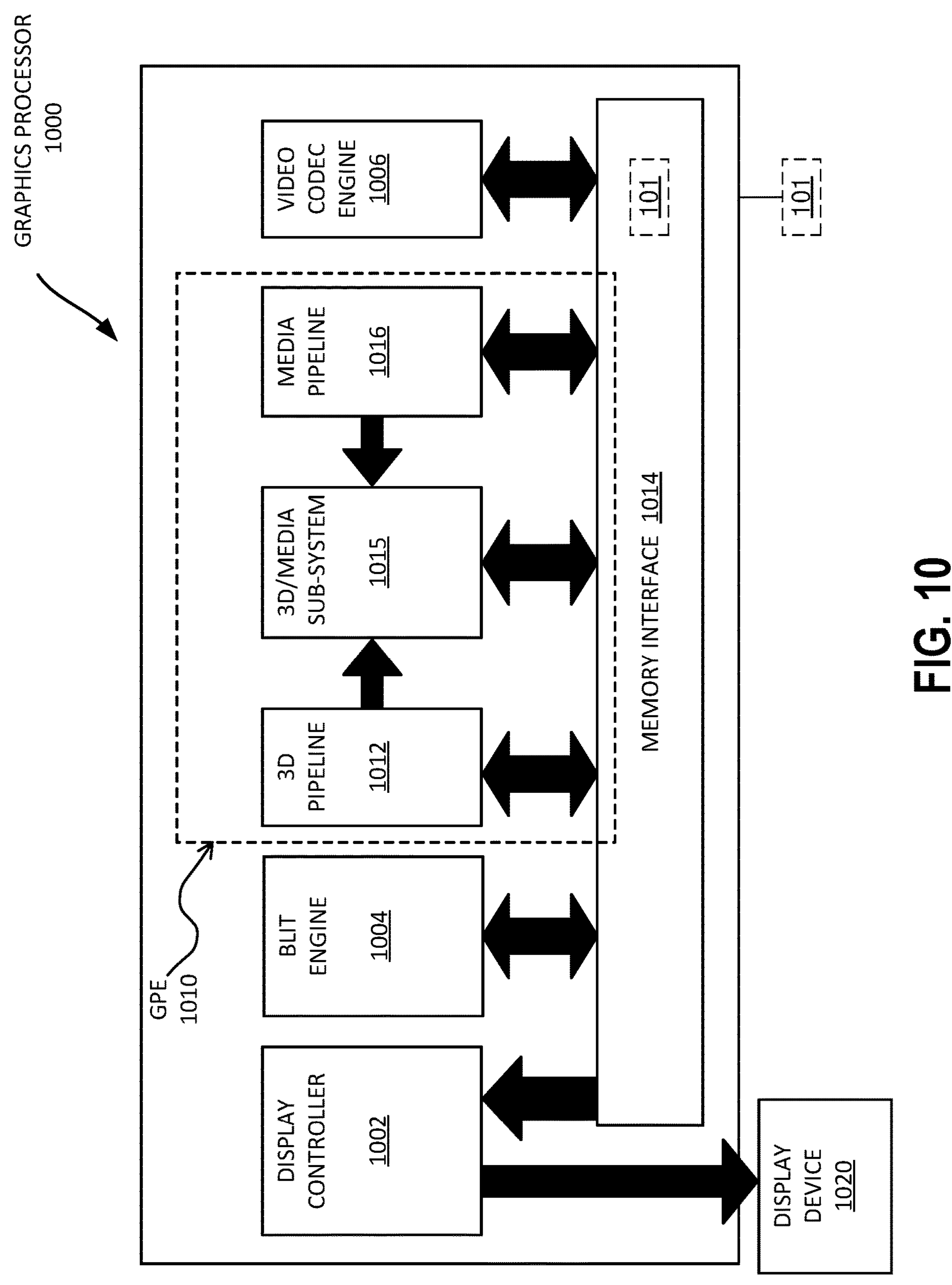
FIG. 10 is a block diagram of a graphics processor, according to an embodiment.

FIG. 10 is a block diagram of a graphics processor 1000, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1000 includes a memory interface 1014 to access memory. Memory interface 1014 can be an interface to local memory, one or more internal caches, one or more shared external caches, and/or to system memory.

In some embodiments, graphics processor 1000 also includes a display controller 1002 to drive display output data to a display device 1020. Display controller 1002 includes hardware for one or more overlay planes for the display and composition of multiple layers of video or user interface elements. In some embodiments, graphics processor 1000 includes a video codec engine 1006 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 321M/VC-1, and Joint Photographic Experts Group (JPEG) formats such as JPEG, and Motion JPEG (MJPEG) formats.

In some embodiments, graphics processor 1000 includes a block image transfer (BLIT) engine 1004 to perform two-dimensional (2D) rasterizer operations including, for example, bit-boundary block transfers. However, in one embodiment, 3D graphics operations are performed using one or more components of graphics processing engine (GPE) 1010. In some embodiments, graphics processing engine 1010 is a compute engine for performing graphics operations, including three-dimensional (3D) graphics operations and media operations.

In some embodiments, GPE 1010 includes a 3D pipeline 1012 for performing 3D operations, such as rendering three-dimensional images and scenes using processing functions that act upon 3D primitive shapes (e.g., rectangle, triangle, etc.). The 3D pipeline 1012 includes programmable and fixed function elements that perform various tasks within the element and/or spawn execution threads to a 3D/Media sub-system 1015. While 3D pipeline 1012 can be used to perform media operations, an embodiment of GPE 1010 also includes a media pipeline 1016 that is specifically used to perform media operations, such as video post-processing and image enhancement.

In some embodiments, media pipeline 1016 includes fixed function or programmable logic units to perform one or more specialized media operations, such as video decode acceleration, video de-interlacing, and video encode acceleration in place of, or on behalf of video codec engine 1006. In some embodiments, media pipeline 1016 additionally includes a thread spawning unit to spawn threads for execution on 3D/Media sub-system 1015. The spawned threads perform computations for the media operations on one or more graphics execution units included in 3D/Media subsystem 1015.

In some embodiments, 3D/Media subsystem 1015 includes logic for executing threads spawned by 3D pipeline 1012 and media pipeline 1016. In one embodiment, the pipelines send thread execution requests to 3D/Media subsystem 1015, which includes thread dispatch logic for arbitrating and dispatching the various requests to available thread execution resources. The execution resources include an array of graphics execution units to process the 3D and media threads. In some embodiments, 3D/Media subsystem 1015 includes one or more internal caches for thread instructions and data. In some embodiments, the subsystem also includes shared memory, including registers and addressable memory, to share data between threads and to store output data.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

The following examples pertain to further embodiments. Example 1 includes an apparatus comprising: configurator logic circuitry to determine an interleave granularity and an address range size for a plurality of devices coupled to a socket of a processor; memory to store a single System Address Decoder (SAD) rule for two or more of the plurality of the devices coupled to the socket of the processor; wherein a memory access transaction directed at a first device from the plurality of devices is to be routed to the first device in accordance with the SAD rule. Example 2 includes the apparatus of example 1, wherein the configurator logic circuitry is to operate in accordance with information from one of: a Basic Input Output System (BIOS), a Unified Extensible Firmware Interface (UEFI), an Option Read Only Memory (Option ROM), and Baseboard Management Controller (BMC) firmware. Example 3 includes the apparatus of example 1, wherein at least one of the plurality of devices comprises one of: a Compute Express Link (CXL) Type-2 device, a Peripheral Component Interconnect express (PCIe) device, an Ultra Path Interconnect (UPI) device, a Gen-Z fabric/protocol device, an Open Coherent Accelerator Processor Interface (OpenCAPI) device, a Cache Coherent Interconnect for Accelerators (CCIX) device, an NVidia® link (NVLink™) device, and a HyperTransport™ interconnect device. Example 4 includes the apparatus of example 1, wherein the memory access transaction directed at the first device is to be routed to an Input-Output (IO) port associated with the first device in response to a look up in accordance with the SAD rule. Example 5 includes the apparatus of example 1, comprising discovery logic circuitry to determine a size and a number of the plurality of devices coupled to the socket of the processor. Example 6 includes the apparatus of example 5, wherein the discover logic circuitry is to store the determined size and number in a plurality of registers, wherein the plurality of registers are accessible by the configurator logic circuitry. Example 7 includes the apparatus of example 1, comprising discovery logic circuitry to determine a size and a number of the plurality of devices coupled to the socket of the processor at boot time or during runtime. Example 8 includes the apparatus of example 7, wherein the discovery logic circuitry is to determine the size and the number of the plurality of devices coupled to the socket of the processor during runtime using System Management Mode (SMM). Example 9 includes the apparatus of example 1, wherein the configurator logic circuitry is to determine the interleave granularity based on a size of a largest sized device from the plurality of devices. Example 10 includes the apparatus of example 1, wherein the configurator logic circuitry is to determine the interleave granularity based on a size of a largest sized device from the plurality of devices, wherein the determined size is to be padded to a next power of two size. Example 11 includes the apparatus of example 1, wherein the configurator logic circuitry is to determine the address range size based on a multiplication of the interleave granularity by a number of the plurality of devices. Example 12 includes the apparatus of example 1, wherein the plurality of devices are coupled to the processor socket via one or more hierarchy of switches.

Example 13 includes one or more non-transitory computer-readable media comprising one or more instructions that when executed on a processor configure the processor to perform one or more operations to cause: configurator logic circuitry to determine an interleave granularity and an address range size for a plurality of devices coupled to a socket of the processor; memory to store a single System Address Decoder (SAD) rule for two or more of the plurality of the devices coupled to the socket of the processor; wherein a memory access transaction directed at a first device from the plurality of devices is to be routed to the first device in accordance with the SAD rule. Example 14 includes the one or more computer-readable media of example 13, further comprising one or more instructions that when executed on the at least one processor configure the at least one processor to perform one or more operations to cause the configurator logic circuitry to operate in accordance with information from one of: a Basic Input Output System (BIOS), a Unified Extensible Firmware Interface (UEFI), an Option Read Only Memory (Option ROM), and Baseboard Management Controller (BMC) firmware. Example 15 includes the one or more computer-readable media of example 13, wherein at least one of the plurality of devices comprises one of: a Compute Express Link (CXL) Type-2 device, a Peripheral Component Interconnect express (PCIe) device, an Ultra Path Interconnect (UPI) device, a Gen-Z fabric/protocol device, an Open Coherent Accelerator Processor Interface (OpenCAPI) device, a Cache Coherent Interconnect for Accelerators (CCIX) device, an NVidia® link (NVLink™) device, and a HyperTransport™ interconnect device. Example 16 includes the one or more computer-readable media of example 13, further comprising one or more instructions that when executed on the at least one processor configure the at least one processor to perform one or more operations to cause the memory access transaction directed at the first device to be routed to an Input-Output (IO) port associated with the first device in response to a look up in accordance with the SAD rule. Example 17 includes the one or more computer-readable media of example 13, further comprising one or more instructions that when executed on the at least one processor configure the at least one processor to perform one or more operations to cause discovery logic circuitry to determine a size and a number of the plurality of devices coupled to the socket of the processor. Example 18 includes the one or more computer-readable media of example 13, further comprising one or more instructions that when executed on the at least one processor configure the at least one processor to perform one or more operations to cause discovery logic circuitry to determine a size and a number of the plurality of devices coupled to the socket of the processor at boot time or during runtime. Example 19 includes the one or more computer-readable media of example 18, further comprising one or more instructions that when executed on the at least one processor configure the at least one processor to perform one or more operations to cause the discovery logic circuitry to determine the size and the number of the plurality of devices coupled to the socket of the processor during runtime using System Management Mode (SMM). Example 20 includes the one or more computer-readable media of example 13, further comprising one or more instructions that when executed on the at least one processor configure the at least one processor to perform one or more operations to cause the configurator logic circuitry to determine the interleave granularity based on a size of a largest sized device from the plurality of devices. Example 21 includes the one or more computer-readable media of example 13, further comprising one or more instructions that when executed on the at least one processor configure the at least one processor to perform one or more operations to cause the configurator logic circuitry to determine the interleave granularity based on a size of a largest sized device from the plurality of devices, wherein the determined size is to be padded to a next power of two size. Example 22 includes the one or more computer-readable media of example 13, further comprising one or more instructions that when executed on the at least one processor configure the at least one processor to perform one or more operations to cause the configurator logic circuitry to determine the address range size based on a multiplication of the interleave granularity by a number of the plurality of devices.

Example 23 includes a method comprising: determining, at configurator logic circuitry, an interleave granularity and an address range size for a plurality of devices coupled to a socket of a processor; storing a single System Address Decoder (SAD) rule in memory for two or more of the plurality of the devices coupled to the socket of the processor; wherein a memory access transaction directed at a first device from the plurality of devices is routed to the first device in accordance with the SAD rule. Example 24 includes the method of example 23, further comprising causing the configurator logic circuitry to operate in accordance with information from one of: a Basic Input Output System (BIOS), a Unified Extensible Firmware Interface (UEFI), an Option Read Only Memory (Option ROM), and Baseboard Management Controller (BMC) firmware. Example 25 includes the method of example 23, wherein at least one of the plurality of devices comprises one of: a Compute Express Link (CXL) Type-2 device, a Peripheral Component Interconnect express (PCIe) device, an Ultra Path Interconnect (UPI) device, a Gen-Z fabric/protocol device, an Open Coherent Accelerator Processor Interface (OpenCAPI) device, a Cache Coherent Interconnect for Accelerators (CCIX) device, an NVidia® link (NVLink™) device, and a HyperTransport™ interconnect device.

Example 26 includes an apparatus comprising means to perform an operation as set forth in any preceding example. Example 27 includes machine-readable storage including machine-readable instructions, when executed, to implement an operation or realize an apparatus as set forth in any preceding example.

In various embodiments, one or more operations discussed with reference to FIG. 1 et seq. may be performed by one or more components (interchangeably referred to herein as "logic") discussed with reference to any of the figures.

In various embodiments, the operations discussed herein, e.g., with reference to FIG. 1 et seq., may be implemented as hardware (e.g., logic circuitry), software, firmware, or combinations thereof, which may be provided as a computer program product, e.g., including one or more tangible (e.g., non-transitory) machine-readable or computer-readable media having stored thereon instructions (or software procedures) used to program a computer to perform a process discussed herein. The machine-readable medium may include a storage device such as those discussed with respect to the figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:

configurator logic circuitry to determine an interleave granularity and an address range size for a plurality of devices of a type coupled to a socket of a processor, wherein the configurator logic circuitry is to determine the interleave granularity based on a size of a Largest sized device from the plurality of devices;

a memory to store a single System Address Decoder (SAD) rule for two or more of the plurality of the devices of a type coupled to the socket of the processor, wherein the SAD rule maps an aggregate memory size required by all devices of the type in the socket and interleaves the devices using higher order physical address bits;

wherein a memory access transaction directed at a first device from the plurality of devices is to be routed to the first device in accordance with the SAD rule, wherein the configurator logic circuitry is to operate at boot time in accordance with information from one of: a Basic Input Output System (BIOS), a Unified Extensible Firmware Interface (UEFI), and a Baseboard Management Controller (BMC) firmware.

2. The apparatus of claim 1, wherein the configurator logic circuitry is to operate in accordance with information from one of: the Basic Input Output System (BIOS), the Unified Extensible Firmware Interface (UEFI), an Option Read Only Memory (Option ROM), and the Baseboard Management Controller (BMC) firmware.

3. The apparatus of claim 1, wherein at least one of the plurality of devices of the type comprises one of: a Compute Express Link (CXL) Type-2 device, a Peripheral Component Interconnect express (PCIe) device, an Ultra Path Interconnect (UPI) device, a Gen-Z fabric/protocol device, an Open Coherent Accelerator Processor Interface (OpenCAPI) device, a Cache Coherent Interconnect for Accelerators (CCIX) device, an Nvidia® link (NVLink™) device, and a HyperTransport™ interconnect device.

4. The apparatus of claim 1, wherein the memory access transaction directed at the first device is to be routed to an Input-Output (IO) port associated with the first device in response to a look up in accordance with the SAD rule.

5. The apparatus of claim 1, comprising discovery logic circuitry to determine a size and a number of the plurality of devices of the type coupled to the socket of the processor.

6. The apparatus of claim 5, wherein the discover logic circuitry is to store the determined size and number in a plurality of registers, wherein the plurality of registers are accessible by the configurator logic circuitry.

7. The apparatus of claim 1, wherein the discovery logic circuitry to determine a size and a number of the plurality of devices coupled to the socket of the processor at boot time or during runtime.

8. The apparatus of claim 7, wherein the discovery logic circuitry is to determine the size and the number of the plurality of devices coupled to the socket of the processor during runtime using System Management Mode (SMM).

9. The apparatus of claim 1, wherein the determined size is to be padded to a next power of two size.

10. The apparatus of claim 1, wherein the configurator logic circuitry is to determine the address range size based on a multiplication of the interleave granularity by a number of the plurality of devices.

11. The apparatus of claim 1, wherein the plurality of devices are coupled to the processor socket via one or more hierarchy of switches.

12. A system comprising:

a processor;

a plurality of devices of a type coupled to a socket the processor;

configurator logic circuitry to determine an interleave granularity and an address range size for the plurality of devices of the type coupled to the socket of the processor, wherein the configurator logic circuitry is to determine the interleave granularity based on a size of a largest sized device from the plurality of devices;

a memory to store a single System Address Decoder (SAD) rule for two or more of the plurality of the devices coupled to the socket of the processor, wherein the SAD rule maps an aggregate memory size required by all devices of the type in the socket and interleaves the devices using higher order physical address bits;

wherein a memory access transaction directed at a first device from the plurality of devices is to be routed to the first device in accordance with the SAD rule, wherein the configurator logic circuitry is to operate at boot time in accordance with information from one of: a Basic Input Output System (BIOS), a Unified Extensible Firmware Interface (UEFI), and a Baseboard Management Controller (BMC) firmware.

13. The system of claim 12, further comprising one or more instructions that when executed on the at least one processor configure the at least one processor to perform one or more operations to cause the configurator logic circuitry to operate in accordance with information from one of: the Basic Input Output System (BIOS), the Unified Extensible Firmware Interface (UEFI), an Option Read Only Memory (Option ROM), and the Baseboard Management Controller (BMC) firmware.

14. The system of claim 12, wherein at least one of the plurality of devices of the type comprises one of: a Compute Express Link (CXL) Type-2 device, a Peripheral Component Interconnect express (PCIe) device, an Ultra Path Interconnect (UPI) device, a Gen-Z fabric/protocol device, an Open Coherent Accelerator Processor Interface (OpenCAPI) device, a Cache Coherent Interconnect for Accelerators (CCIX) device, an Nvidia® link (NVLink™) device, and a HyperTransport™ interconnect device.

15. The system of claim 12, further comprising one or more instructions that when executed on the at least one processor configure the at least one processor to perform one or more operations to cause the memory access transaction directed at the first device to be routed to an Input-Output (IO) port associated with the first device in response to a look up in accordance with the SAD rule.

16. The system of claim 12, further comprising one or more instructions that when executed on the at least one processor configure the at least one processor to perform one or more operations to cause discovery logic circuitry to determine a size and a number of the plurality of devices coupled to the socket of the processor.

17. The system of claim 12, further comprising one or more instructions that when executed on the at least one processor configure the at least one processor to perform one or more operations to cause discovery logic circuitry to determine a size and a number of the plurality of devices coupled to the socket of the processor at boot time or during runtime.

18. The system of claim 17, further comprising one or more instructions that when executed on the at least one processor configure the at least one processor to perform one or more operations to cause the discovery logic circuitry to determine the size and the number of the plurality of devices coupled to the socket of the processor during runtime using System Management Mode (SMM).

19. The system of claim 12, further comprising one or more instructions that when executed on the at least one processor configure the at least one processor to perform one or more operations to cause the configurator logic circuitry to determine the interleave granularity based on a size of a largest sized device from the plurality of devices, wherein the determined size is to be padded to a next power of two size.

20. The system of claim 12, further comprising one or more instructions that when executed on the at least one processor configure the at least one processor to perform one or more operations to cause the configurator logic circuitry to determine the address range size based on a multiplication of the interleave granularity by a number of the plurality of devices.

* * * * *